(12) United States Patent
Gerard et al.

(10) Patent No.: US 11,807,703 B2
(45) Date of Patent: Nov. 7, 2023

(54) LIQUID COMPOSITION FOR APPLICATIONS OF SMC-MOULDED THERMOPLASTIC COMPOSITES

(71) Applicant: Arkema France, Colombes (FR)

(72) Inventors: Pierre Gerard, Denguin (FR); Guillaume R. Cledat, Marco en Baroeul (FR)

(73) Assignee: ARKEMA FRANCE, Colombes (FR)

( * ) Notice: Subject to any disclaimer, the term of this patent is extended or adjusted under 35 U.S.C. 154(b) by 163 days.

(21) Appl. No.: 16/765,490

(22) PCT Filed: Nov. 21, 2018

(86) PCT No.: PCT/FR2018/052943
§ 371 (c)(1),
(2) Date: May 20, 2020

(87) PCT Pub. No.: WO2019/102145
PCT Pub. Date: May 31, 2019

(65) Prior Publication Data
US 2020/0317843 A1 Oct. 8, 2020

(30) Foreign Application Priority Data
Nov. 21, 2017 (FR) ..................... 17 61024

(51) Int. Cl.
| | |
|---|---|
| *C08F 265/06* | (2006.01) |
| *C08J 5/24* | (2006.01) |
| *C08K 3/12* | (2006.01) |
| *C08K 3/22* | (2006.01) |
| *C08K 3/26* | (2006.01) |
| *C08K 3/36* | (2006.01) |

(52) U.S. Cl.
CPC ............. *C08F 265/06* (2013.01); *C08J 5/243* (2021.05); *C08J 5/244* (2021.05); *C08J 5/249* (2021.05); *C08K 3/22* (2013.01); *C08K 3/26* (2013.01); *C08J 2333/12* (2013.01); *C08K 3/36* (2013.01); *C08K 2003/222* (2013.01); *C08K 2003/2227* (2013.01); *C08K 2003/2241* (2013.01); *C08K 2003/265* (2013.01)

(58) Field of Classification Search
CPC ........ C08F 265/06; C08J 5/24; C08J 2333/12; C08K 3/22; C08K 3/26; C08K 3/36; C08K 2003/222; C08K 2003/2227; C08K 2003/2241; C08K 2003/265
USPC .......................................... 524/460
See application file for complete search history.

(56) References Cited

U.S. PATENT DOCUMENTS

2011/0178228 A1* 7/2011 Kim ............... C08F 265/06
525/330.3
2016/0032080 A1 2/2016 Gerard et al.

FOREIGN PATENT DOCUMENTS

| EP | 0 749 990 A1 | 12/1996 |
| JP | 2001009829 | 1/2001 |
| JP | 2001009829 A * | 1/2001 |

OTHER PUBLICATIONS

Office Action (Notification to Article 94(3) CBE) dated Jun. 22, 2022, by the European Patent Office in corresponding European Application No. 18 816 208.5-1107, 9 pages.

* cited by examiner

*Primary Examiner* — Kelechi C Egwim
(74) *Attorney, Agent, or Firm* — BUCHANAN, INGERSOLL & ROONEY PC

(57) ABSTRACT

The invention relates to a liquid composition comprising:
a) a (meth)acrylic polymer,
b) a (meth)acrylic monomer, and
c) a maturation agent selected from a metal oxide or a metal hydroxide,
said (meth)acrylic polymer comprising a monomer which carries a carboxylic acid function,
and/or said (meth)acrylic monomer carrying a carboxylic acid function, and
said liquid composition having a dynamic viscosity of between 10 mPa·s and 10 000 mPa·s at 25° C.

18 Claims, 4 Drawing Sheets

LIQUID COMPOSITION FOR APPLICATIONS OF SMC-MOULDED THERMOPLASTIC COMPOSITES

This application claims benefit, under U.S.C. § 119 or § 365 of PCT Application Number PCT/FR2018/052943, filed Nov. 21, 2018, and French Patent Application Number FR 17.61024 filed Nov. 21, 2017, these documents being incorporated herein by reference.

The invention pertains to the field of composite materials, and more particularly of composite parts obtained from SMC materials, suitable in particular for use in the sectors of automotive engineering, transport, building, electrical and electronic equipment, and sports and leisure equipment. The invention relates to a liquid composition and a process for preparing it, to a process for manufacturing a preimpregnated fibrous material and the preimpregnated fibrous material obtained, to a process for manufacturing a composite material part, and to a composite material part obtained by such processes.

PRIOR ART

For several decades, the use of composite materials with fibrous reinforcements and a polymer matrix has experienced a considerable boom in numerous sectors, especially in the automobile industry. The composites employed in this sector include SMC (sheet molding compound) and BMC (bulk molding compound) composites. These materials consist of a thermosetting polymer matrix, granular mineral fillers, and fibrous reinforcements in the form of long or short fibers. The thermosetting polymer matrix is generally composed of unsaturated polyester and various chemical components added to this matrix.

These composites are widely used on account of the numerous advantages that they exhibit, such as stiffness, lightness, corrosion resistance, thermomechanical stability, and electrical insulation. As well as their good physical and mechanical properties, their moderate costs of manufacture and of deployment make them highly competitive in relation to metal alloys such as steels and aluminum alloys.

Parts based on SMC are molded by compression and take the form generally of large panels. BMC parts are molded by compression or, preferably, by conventional thermosetting injection, or by injection in a semiclosed mold, followed by a compression phase. They are smaller in size than their SMC counterparts, but are able, however, to take on more complex shapes, by virtue of their molding process. SMC and BMC composites generally have matrices which are specially developed for this type of process, characterized by short polymerization times enabling adaptation to the cycles required particularly in the automotive sector. For example, these composites can be used for the manufacture of bodywork parts, provided they have a flawless appearance in terms of surface rendering. They can also be used for the manufacture of a semistructural part, or of hidden parts which require good mechanical performance.

The manufacture of parts using these composite materials involves a series of complex processes. To start with, a compound, or paste, is developed which combines mineral fillers, polymer matrix, and various chemical additives. The way in which the fillers and the additives are mixed with the polymer matrix is similar irrespective of the class of composites in question, BMC or SMC, and the paste ultimately obtained is used to impregnate the fibrous reinforcement. The impregnation processes, on the other hand, may differ widely according to the classes of composites. In the case of BMCs, a mixer makes it possible to obtain a solid compound which is stored in bags, cartons or drums.

In the case of SMCs, the fibrous reinforcement is impregnated on the line in a machine which at its exit delivers sheets which are, in general, wound onto a core or packaged in boxes or in cartons. During impregnation, in the preparation of polymer composites, the viscosity of the impregnation syrup must be regulated and adapted so as not to be too fluid or too viscous, so as to properly impregnate each fiber of the fibrous reinforcement. The reason is that partial wetting, because the syrup is either too fluid or too viscous, leads to the appearance of "bare" zones, these being unimpregnated zones, or zones comprising bubbles. These "bare" zones and these bubbles give rise to the appearance of defects in the final composite material, which are the cause, among others, of a loss of mechanical strength of the final composite material.

The rolls of SMC obtained are subsequently stored for a period of several days, referred to as the maturation phase, which makes it possible to obtain a material which is easy to handle. The reason is that, while the SMC compound at the start of the process exhibits a low viscosity at ambient temperature, allowing it to be conveyed by flow and to impregnate the fibrous reinforcement effectively at this temperature, the SMC paste composites are required to have a very high viscosity at ambient temperature, so as to be easily conveyed, cut, defilmed, and placed in the press without suffering alteration when they are molded. Accordingly, between their manufacture and their molding, the preimpregnated fibrous reinforcements or SMC compounds require a step of modification in their viscosity, referred to as the maturation step, during which their viscosity increases to the point where they become amenable to handing at ambient temperature. Not all polymers or polymeric matrices, however, are able to withstand such a modification in viscosity without detriment to their physical properties. Nowadays, accordingly, the SMC pastes consist generally of a thermosetting matrix based on an unsaturated polyester resin, which tolerates a maturation step of this kind.

The maturation step is generally initiated by reaction of the unsaturated polyester resin with a metal oxide or metal hydroxide such as magnesium oxide (MgO), which is commonly called magnesia. Generally speaking, this allows the development, within a few days at ambient temperature, of a sharp increase in the viscosity of the impregnating paste, and then, after approximately several days of maturation, a slowing in the increase in the viscosity, which reaches a pseudoplateau. This maturation time, which cannot be shortened, may cause a slowing of the industrial cycles.

Next, the SMC composites are subsequently shaped by compression in a hot mold. For certain applications, it is highly desirable to have a liquid composition which polymerizes rapidly with good conversion, in order to increase productivity. Moreover, contact with the hot mold may be accompanied by harmful shrinkage phenomena, which can be compensated by the addition of appropriate additives. The SMC pastes generally consist of a thermosetting matrix based on an unsaturated polyester resin blended with a thermoplastic additive. The reason is that the presence of a thermoplastic additive allows compensation of the shrinkage which is generally observed. Nevertheless, it is not possible to increase excessively the concentration of thermoplastic, since an increase in the level of thermoplastic additive generally gives rise to a phase inversion. Accordingly, a conventional antishrink additive is rarely incorporated at more than 25% in the matrix, because the phase inversion is undesirable: a discrete UPR phase in a continuous thermoplastic phase would lead to a sharp decrease in the elasticity modulus of the composite. A high level of thermoplastic additive would also give rise to problems with the use of the compound (excessively viscous impregnating paste).

The document EP 2336241 describes a resin syrup for producing an artificial marble, and a process for manufacturing such a syrup.

The document FR3002943 describes an impregnating syrup for a fibrous substrate, comprising flame retardant. The flame retardant should not interfere with the viscosity of the syrup, so as to allow proper impregnation of the fibers.

The current methods, therefore, do not allow a thermoplastic-based polymeric matrix to be used in an SMC process, whereas the latter could enable the thermoforming and recycling of these composites.

A need therefore exists for new liquid compositions for impregnating fibrous reinforcements, that can be employed in processes for manufacturing SMC composites and that are capable of addressing the problems raised by the existing methods.

Technical Problem

The invention therefore aims to overcome the disadvantages of the prior art. An aim of the invention more particularly is to provide a liquid composition which can be used for impregnating a fibrous reinforcement in the context, for example, of the preparation of an SMC composite, said composition enabling an increase in the production rate of composite parts, particularly by shortening the maturation step (e.g., for a more rapid attainment of the viscosity plateau, so as to prevent quality problems on the polymerized part), by limiting the shrinkage which is generally observed in this application, and by allowing faster polymerization.

Another aim of the invention is to provide a polymer composite material which can be shaped as a preimpregnated strip, being thermoformable and readily recyclable. Moreover, the composite parts manufactured according to the invention are light and have advantageous mechanical and esthetic properties, particularly for application in the automotive sector.

BRIEF DESCRIPTION OF THE INVENTION

The invention accordingly provides a liquid composition comprising:
a) a (meth)acrylic polymer,
b) a (meth)acrylic monomer, and
c) a maturation agent selected from a metal oxide or a metal hydroxide,
said (meth)acrylic polymer comprising a monomer which carries a carboxylic acid function, and/or
said (meth)acrylic monomer carrying a carboxylic acid function, and
said liquid composition having a dynamic viscosity of between 10 mPa·s and 10 000 mPa·s at 25° C.

By virtue of the liquid composition according to the invention, as will be shown in the examples, it is possible to reduce the maturation time and to attain the viscosity pseudoplateau much more rapidly. This composition therefore addresses the problems which occur in the prior art in attempts to increase the production rate for composite parts. Moreover, this liquid composition makes it possible to reduce the shrinkage commonly observed during polymerization, in a mold, of the composite impregnating a fibrous reinforcement. Moreover, a composition of this kind allows the production of thermoplastic composites, which will be able to be thermoformed and recycled more than thermosetting composites.

According to other advantageous characteristics of the liquid composition:
the weight-average molecular weight of the (meth)acrylic polymer is greater than or equal to 70 000 g/mol, preferably greater than or equal to 80 000 g/mol, and more preferably greater than or equal to 85 000 g/mol. This is because with a molecular weight of this kind and with the presence of these macromolecular chains, the mechanical properties of the composite part formed from this liquid composition are enhanced, nearing the mechanical properties of a thermosetting composite.
It comprises at least two initiators and, at a given temperature, the two initiators have different half-lives. This characteristic is particularly advantageous since it allows a reduction in polymerization time and therefore provides the possibility of integrating such a polymerization into industrial processes in which the rate is particularly high.

According to another aspect, the invention further relates to a process for preparing a liquid composition according to the invention, said process comprising the following steps:
i) preparing a mixture of (meth)acrylic polymer and (meth)acrylic monomer, said (meth)acrylic polymer comprising a monomer which carries a carboxylic acid function and/or said (meth)acrylic monomer carrying a carboxylic acid function,
ii) adding a maturation agent selected from a metal oxide or a metal hydroxide to the mixture prepared in the preceding step.

According to another aspect, the invention further relates to the use of the liquid composition according to the invention, or prepared by the preparation process according to the invention, for impregnating a fibrous reinforcement.

According to another aspect, the invention further relates to a process for manufacturing a preimpregnated fibrous material, comprising a step of impregnating a fibrous reinforcement with a liquid composition according to the invention.

According to another aspect, the invention further relates to a preimpregnated fibrous material comprising: a liquid composition according to the invention and a fibrous reinforcement.

According to another aspect, the invention further relates to a process for manufacturing a preimpregnated fibrous material, comprising a step of impregnating a fibrous reinforcement with a liquid composition according to the invention, and a maturation step during which the viscosity of the composition increases to reach a plateau.

The preimpregnated fibrous material is preferably a preimpregnated fibrous material in the form of a sheet.

Advantageously, the fibrous reinforcement is composed of continuous fibers, said continuous fibers having an aspect ratio of at least 1000. The reason is that an aspect ratio of this kind makes it possible to obtain composite parts which have better mechanical properties. For example, advantageously, in the SMC process, if the short fibers and the mineral fillers are replaced with continuous fibers (i.e., fibers having a high aspect ratio), this allows enhancement of the mechanical properties and hence the realization of structural parts.

According to another aspect, the invention further relates to a process for manufacturing a composite material part from a preimpregnated fibrous material according to the invention, said process comprising a step of shaping the preimpregnated fibrous material and a polymerization step.

According to another aspect, the invention further relates to a composite material part obtained by the manufacturing process according to the invention. The composite material part is advantageously a three-dimensional part.

BRIEF DESCRIPTION OF THE DRAWINGS

Other advantages and features of the invention will become apparent on reading the following description given by way of illustrative and nonlimiting example, with reference to the appended figures, which depict.

DESCRIPTION OF THE INVENTION

Figure 1:
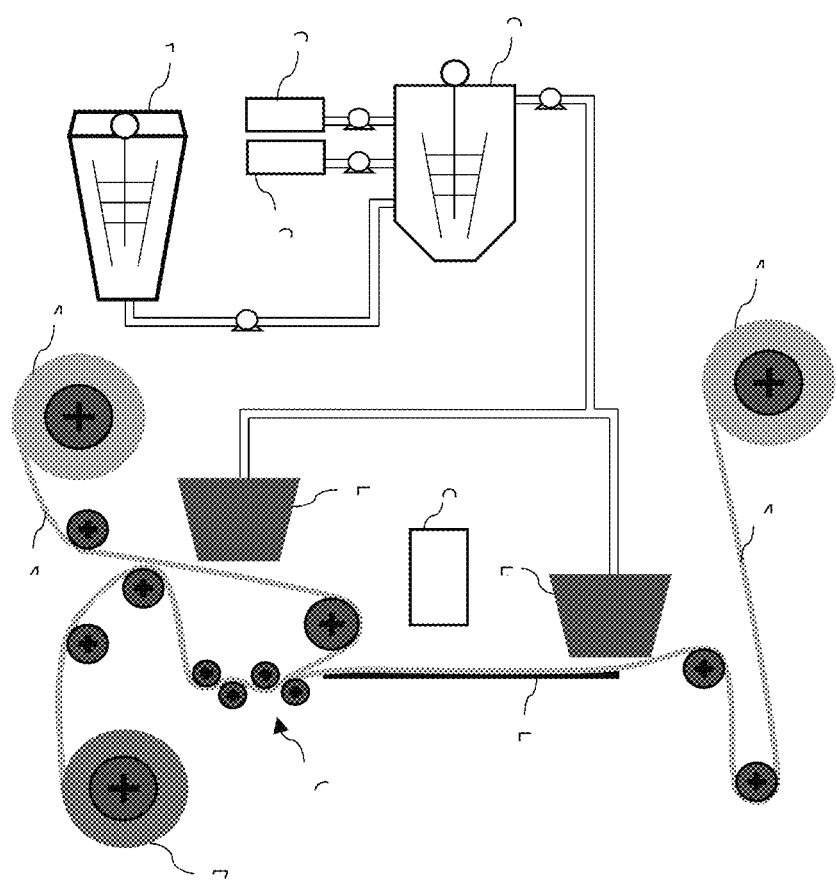
FIG. 1, an industrial process for manufacturing preimpregnated fibrous reinforcements according to the invention.

In the present context, the term "monomer" denotes a molecule which can undergo a polymerization. The expression "monomer unit" denotes, within a polymer, a portion of the polymer that corresponds to one of the monomers used for the synthesis of the polymer.

In the present context, the term "(meth)acrylic" denotes any type of acrylic or methacrylic monomer.

The term "(meth)acrylic monomer" means any type of acrylic and methacrylic monomer.

In the present context, the term "polymerization" denotes the process of converting a monomer or a mixture of monomers into a polymer.

The term "polymer" means either a copolymer or a homopolymer. The term "copolymer" means a polymer grouping together several different monomer units and the term "homopolymer" means a polymer grouping together identical monomer units. The term "block copolymer" means a polymer comprising one or more uninterrupted sequences of each of the separate polymer species, the polymer sequences being chemically different from each other and being bonded to each other via a covalent bond. These polymer sequences are also known as polymer blocks.

For the purposes of the invention, the term "thermoplastic polymer" means a polymer that is generally solid at ambient temperature, which may be crystalline, semicrystalline or amorphous, and which softens during an increase in temperature, in particular after passing its glass transition temperature (Tg) and flows at higher temperature and that may exhibit obvious melting on passing its so-called melting temperature (Tm) (when it is semicrystalline or crystalline) and which becomes solid again when the temperature is reduced below its melting temperature and below its glass transition temperature. This also applies to thermoplastic polymers slightly crosslinked by the presence of polyfunctional oligomers or monomers in the formulation of the liquid composition according to the invention, in a percentage by mass of preferably less than 10%, preferably less than 5% and preferably less than 2%, which can be thermoformed when they are heated above the softening temperature.

The term "(meth)acrylic polymer" means a polymer essentially comprising (meth)acrylic monomers which represent at least 50% by weight of the (meth)acrylic polymer.

For the purposes of the invention, the term "PMMA" denotes homo- and copolymers of methyl methacrylate (MMA), the weight ratio of MMA in the PMMA preferably being at least 70% by weight for the MMA copolymer.

For the purposes of the invention, the term "thermosetting polymer" means a plastic material which is irreversibly transformed by polymerization into an insoluble polymer network.

For the purposes of the invention, the expression "polymer composite" denotes a multi-component material comprising at least two immiscible components, in which at least one component is a polymer and the other component may be, for example, a fibrous reinforcement.

For the purposes of the invention, the term "fibrous reinforcement" means a plurality of fibers, unidirectional roving s or a continuous filament mat, fabrics, felts or nonwoven fabrics which may be in the form of strips, webs, braids, strands or parts.

The term "matrix" means a substance serving as a binder which is capable of transferring forces to the fibrous reinforcement. The "polymer matrix" includes polymers but may also include other compounds or materials. Thus, the "(meth)acrylic polymer matrix" relates to any type of compounds, polymers, oligomers, copolymers or block copolymers, both acrylic and methacrylic. However, it would not be departing from the scope of the invention if the (meth)acrylic polymer matrix comprised up to 10% by weight, preferably less than 5% by weight, of other nonacrylic monomers chosen for example from the group: butadiene, isoprene, styrene, substituted styrene, such as α-methylstyrene or tert-butylstyrene, cyclosiloxanes, vinylnaphthalenes and vinylpyridines.

For the purposes of the invention, the term "radical initiator" denotes a compound that can start/initiate the polymerization of a monomer or monomers.

In the present context, the term "half-life", $t_{1/2}$, denotes the time taken for an initial amount of initiator to reduce in concentration by half. This time is generally dependent on the temperature.

The abbreviation "phr" denotes parts by weight per hundred parts of composition. For example, 1 phr of initiator in the composition means that 1 kg of initiator is added to 100 kg of composition.

The abbreviation "ppm" denotes parts by weight per million parts of composition. For example, 1000 ppm of a compound in the composition means that 0.1 kg of compound is present in 100 kg of composition.

In the remainder of the description, the same references are used to indicate the same elements.

According to a first aspect, the present invention relates to a liquid composition comprising a (meth)acrylic polymer, or precursor (meth)acrylic polymer, and a (meth)acrylic monomer. It may in particular comprise a (meth)acrylic monomer, a precursor (meth)acrylic polymer and a radical initiator as described in WO2013056845 and WO2014013028.

This liquid composition also comprises a maturation agent selected from a metal oxide or a metal hydroxide, and is characterized in particular in that it comprises (meth)acrylic monomers carrying a carboxylic acid function, these monomers being free in solution or integrated into the (meth)acrylic polymer. Thus, more particularly, said (meth)acrylic polymer and/or said (meth)acrylic monomer comprise at least one carboxylic acid function. According to one embodiment of a liquid composition according to the invention, the (meth)acrylic monomer carries a carboxylic acid function and the (meth)acrylic polymer comprises a monomer which carries a carboxylic acid function.

During the impregnation, when polymer composite is being prepared, the viscosity of the liquid (meth)acrylic composition, or impregnating syrup, must be regulated and adapted so as not to be too fluid or too viscous, so as to prevent a loss of mechanical strength in the eventual composite material. It is desirable, moreover, to have a liquid composition which polymerizes rapidly with good conversion, in order to increase productivity.

Said liquid composition therefore has a dynamic viscosity of between 10 mPa·s and 10 000 mPa·s at 25° C. The dynamic viscosity of the liquid composition or of the (meth)acrylic syrup is in a range from 10 mPa*s to 10 000 mPa*s, preferably from 20 mPa*s to 7000 mPa*s, and advantageously from 20 mPa*s to 5000 mPa*s. The viscosity of the liquid (meth)acrylic composition, or liquid (meth)acrylic syrup, can be easily measured with a rheometer or viscometer. The dynamic viscosity is measured at 25° C. If the liquid (meth)acrylic syrup exhibits Newtonian behavior, meaning without shear thinning, the dynamic viscosity is independent of the shearing in a rheometer or of the speed of the spindle in a viscometer. If the liquid composition shows non-Newtonian behavior, i.e. with shear thinning, the dynamic viscosity is measured at a shear rate of 1 s$^{-1}$ at 25° C.

The (meth)acrylic monomer is selected, for example, from acrylic acid, methacrylic acid, alkylacrylic monomers, alkylmethacrylic monomers, hydroxyalkylacrylic monomers and hydroxyalkylmethacrylic monomers, and mixtures thereof.

Preferably, the (meth)acrylic monomer is selected from acrylic acid, methacrylic acid, hydroxyalkylacrylic monomers, hydroxyalkylmethacrylic monomers, alkylacrylic monomers, alkylmethacrylic monomers and mixtures thereof, the alkyl group containing from 1 to 22 linear, branched or cyclic carbons; the alkyl group preferably containing from 1 to 12 linear, branched or cyclic carbons.

The (meth)acrylic monomer more preferably comprises a carboxylic acid function and an ethylenic unsaturation which is able to copolymerize with a methyl methacrylate.

The (meth)acrylic monomer carrying a carboxylic acid function may be selected, for example, from: acrylic acid, citraconic acid, itaconic acid, mesaconic acid, methacrylic acid, and mixtures thereof. The (meth)acrylic monomer carrying a carboxylic acid function is preferably selected from: methacrylic acid, acrylic acid, and mixtures thereof.

Advantageously, therefore, the (meth)acrylic monomer is selected from a mixture comprising:
 a first (meth)acrylic monomer selected from: methyl methacrylate, ethyl methacrylate, methyl acrylate, ethyl acrylate, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and
 a second (meth)acrylic monomer selected from: methacrylic acid, acrylic acid, and mixtures thereof.

According to a preferred embodiment, at least 50% by weight and preferably at least 60% by weight of the (meth)acrylic monomer is methyl methacrylate. More preferably at least 70% by weight, advantageously at least 80% by weight and more advantageously still 90% by weight of the monomer is methyl methacrylate.

The liquid composition according to the invention may preferably comprise at least 0.1% by weight of (meth)acrylic monomer carrying a carboxylic acid function, more preferably at least 1% by weight.

For example, it may comprise at least 0.1% by weight of acrylic acid or methacrylic acid.

For example, it may comprise between 0.1% by weight and 10% by weight of a (meth)acrylic monomer carrying a carboxylic acid function. It may preferably comprise between 0.1% by weight and 10% by weight of acrylic acid or methacrylic acid. More preferably, it may comprise between 1% by weight and 6% by weight of acrylic acid or methacrylic acid.

Regarding the (meth)acrylic polymer, or precursor (meth)acrylic polymer, mention may be made of polyalkyl methacrylates or polyalkyl acrylates. According to a preferred embodiment, the precursor (meth)acrylic polymer is poly (methyl methacrylate) (PMMA).

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA having a different composition of monomers.

The (meth)acrylic polymer may be a random copolymer or a block copolymer. The skilled person will be able to find processes for preparing block copolymers, particularly in the document WO2014135815.

The methyl methacrylate copolymer comprises from 70% to 99.9% by weight of methyl methacrylate and from 0.1% to 30% by weight of at least one monomer containing at least one ethylenic unsaturation that can copolymerize with the methyl methacrylate.

According to a first preferred embodiment, the methyl methacrylate copolymer comprises from 80% to 99.9%, advantageously from 90% to 99.9% and more advantageously from 90% to 99.8% by weight of methyl methacrylate and from 0.1% to 20%, advantageously from 0.1% to 10% and more advantageously from 0.2% to 10% by weight of at least one monomer containing at least one ethylenic unsaturation that can copolymerize with the methyl methacrylate.

The (meth)acrylic polymer preferably comprises a monomer or a comonomer which carries a carboxylic acid function. The comonomer which carries a carboxylic acid function is preferably selected from: acrylic acid, methacrylic acid, and mixtures thereof.

The (meth)acrylic polymer preferably comprises at least 0.1% by weight of a monomer which carries a carboxylic acid function. The (meth)acrylic polymer more preferably comprises at least 1% by weight, more preferably still at least 1.5% by weight, of a monomer carrying a carboxylic acid function. For example, the (meth)acrylic polymer comprises between 1% and 10% of a monomer which carries a carboxylic acid function. The (meth)acrylic polymer preferably comprises between 0.5% and 6% of a monomer which carries a carboxylic acid function.

According to one variant, it would also be possible to use a mixture of two (meth)acrylic polymers, each comprising at least 0.1% by weight of a monomer which carries a carboxylic acid function, and the (meth)acrylic polymers preferably comprising between 0.5% and 6% of a monomer which carries a carboxylic acid function. The difference between the two (meth)acrylic polymers, each comprising at least 0.1% by weight of a monomer which carries a carboxylic acid function, is the composition or the molecular mass. Either the amount of monomer which carries a carboxylic acid function is different, at least 0.25% by weight in the (meth)acrylic polymer, preferably at least 0.5% by weight and more preferably at least 1% by weight; or the difference in the weight-average molecular mass Mw is at least 10 000 g/mol, preferably 20 000 g/mol, more preferably 25 000 g/mol.

Preferably, therefore, the (meth)acrylic monomer carrying a carboxylic acid function or monomer which carries a carboxylic acid function are selected from: acrylic acid and methacrylic acid.

Advantageously, the weight-average molecular weight of the (meth)acrylic polymer is high, namely greater than 70 000 g/mol, preferably greater than 85 000 g/mol, and more preferably greater than or equal to 100 000 g/mol. The weight-average molecular weight may be measured by size exclusion chromatography. The use of a (meth)acrylic polymer having a high weight makes it possible to obtain better mechanical properties for the eventual composite part, with mechanical properties nearing those of thermosetting composites.

The precursor (meth)acrylic polymer is fully soluble in the (meth)acrylic monomer or in the mixture of (meth)acrylic monomers. It makes it possible for the viscosity of the (meth)acrylic monomer or of the mixture of (meth)acrylic monomers to be increased. The liquid composition or solution obtained is generally referred to as "syrup" or "prepolymer". The dynamic viscosity value of the liquid (meth)acrylic syrup is between 10 mPa·s and 10 000 mPa·s. The viscosity of the syrup may be readily measured with a rheometer or a viscometer. The dynamic viscosity is measured at 25° C. Advantageously, the liquid (meth)acrylic syrup contains no additional solvent added intentionally.

The maturation agent for its part is selected from a metal oxide or a metal hydroxide. It may for example be selected from: MgO, Mg(OH)$_2$, CaO, Ca(OH)$_2$ or ZnO. The maturation agent is preferably magnesium oxide.

According to a preferred embodiment, the liquid composition according to the invention comprises at least 0.5 phr of maturation agent. More preferably, it comprises between 1 phr and 10 phr of maturation agent. More preferably still, it comprises between 1 phr and 5 phr of maturation agent.

In order to conserve a dynamic viscosity of the liquid composition or of the (meth)acrylic syrup, besides the fact that it allows good impregnation of the fibrous reinforcement, if necessary, and to conserve the thermoplastic properties of the matrix obtained after polymerization of the fibrous reinforcement preimpregnated with the syrup, the compounds of the syrup are incorporated in the following percentages by mass:

the (meth)acrylic monomer in the liquid composition or the (meth)acrylic syrup are present in proportions of between 40% and 90% by weight and preferably between 45% and 85% by weight of the composition consisting of the (meth)acrylic monomer and the (meth)acrylic polymer, the (meth)acrylic polymer in the liquid composition or the (meth)acrylic syrup are present in proportions of between 10% and 60% by weight and advantageously between 15% and 55% by weight of the composition consisting of the (meth)acrylic monomer(s) and the (meth)acrylic polymer; preferably, the (meth)acrylic polymer in the liquid composition is present in proportions of between 18% and 30%, more preferably between 20% and 25% by weight of the composition consisting of the (meth)acrylic monomer and the (meth)acrylic polymer.

Accordingly, in a first preferred embodiment, a liquid composition according to the invention may comprise:
a) from 10% by weight to 60% by weight of (meth)acrylic polymer,
b) from 40% by weight to 90% by weight of (meth)acrylic monomer, including at least 0.1% by weight of a (meth)acrylic monomer carrying a carboxylic acid function, and from 0.5 phr to 10 phr of maturation agent.

The amount of (meth)acrylic polymer and of (meth)acrylic monomer is expressed by weight of the composition consisting of the (meth)acrylic monomer and the (meth)acrylic polymer.

Accordingly, in a second preferred embodiment, a liquid composition according to the invention may comprise:
a) from 10% by weight to 60% by weight of a (meth)acrylic polymer, said (meth)acrylic polymer comprising at least 1% by weight of a monomer which carries a carboxylic acid function,
b) from 40% by weight to 90% by weight of (meth)acrylic monomer, and from 0.5 phr to 10 phr of maturation agent.

The amount of (meth)acrylic polymer and of (meth)acrylic monomer is expressed by weight of the composition consisting of the (meth)acrylic monomer and the (meth)acrylic polymer.

The liquid composition may further comprise a radical initiator. The radical initiators generate radicals which initiate the monomer(s) to set off a radical polymerization of the monomers so as to form polymer chains by propagation.

Mention may be made of radical polymerization initiators which are preferably water-soluble, or radical polymerization initiators which are fat-soluble or partially fat-soluble. The water-soluble radical polymerization initiators are notably sodium, potassium or ammonium persulfates, used alone or in the presence of reducing agents such as sodium metabisulfites or hydrosulfites, sodium thiosulfate, sodium formaldehyde-sulfoxylate, a mixture of disodium salt of 2-hydroxy-2-sulfinoacetic acid, sodium sulfite and disodium salt of 2-hydroxy-2-sulfoacetic acid, or else a mixture of disodium salt of hydroxysulfinoacetic acid and disodium salt of hydroxysulfoacetic acid. The fat-soluble or partially fat-soluble radical polymerization initiators are notably peroxides or hydroperoxides, 1,1,2,2-tetraphenylethane-1,2-diol or another C—C initiator, and derivatives of azobisisobutyronitrile.

The peroxides or hydroperoxides may be used in combination with the reducing agents so as to lower their activation temperature.

A radical initiator is preferably activated by heat. Thus, the initiator is preferably stable at ambient temperature, allowing the compound to be stored for several weeks if necessary without consumption of inhibitor. The decomposition of the initiator may, conversely, be very rapid at the molding temperature, in order to allow a high production rate (i.e., production cycle of 2 to 3 minutes). Preference is therefore given to peroxides having a half-life of less than 1 hour at temperatures of between 40° C. and 150° C. The radical initiator may advantageously be selected from a compound comprising a peroxy group or compounds comprising an azo group, and preferably from a compound comprising a peroxy group. The compound comprising a peroxy group is preferably selected from diacyl peroxides, peroxyesters, peroxydicarbonates, peroxycarbonates, dialkyl peroxides, peroxyacetals, a hydroperoxide or a peroxyketal.

In one particular embodiment the liquid composition according to the invention may comprise at least two initiators. In this case, these radical initiators are selected such that at a given temperature $T_1$, the two initiators have different half-lives.

More preferably, the second radical initiator, at a given temperature $T_1$, exhibits a half-life $t_{1/2}$ which is at least twice the half-life $t_{1/2}$ of the first radical initiator. More preferably still, the second radical initiator, at a given temperature $T_1$, exhibits a half-life $t_{1/2}$ which is at least three times, advantageously four times, more advantageously five times, more advantageously still six times the half-life $t_{1/2}$ of the first radical initiator.

The temperature $T_1$ is preferably between 20° C. and 160° C., more preferably between 40° C. and 140° C. and advantageously between 50° C. and 130° C.

More preferably, the first radical initiator exhibits a half-life $t_{1/2}$ of 1 hour at a temperature of between 40° C. and 90° C., more preferably still between 45° C. and 80° C. and more preferably still between 50° C. and 75° C.

More preferably, the second radical initiator exhibits a half-life $t_{1/2}$ of 1 hour at a temperature of at least 70° C., more preferably still of at least 75° C.

More preferably, the second radical initiator exhibits a half-life $t_{1/2}$ of 1 hour at a temperature of between 70° C. and 150° C., more preferably still between 75° C. and 140° C. and more preferably still between 75° C. and 130° C.

These radical initiators may also be selected such that, for a given half-life, the difference in the temperature is at least 5 K between the two initiators. This means that if, for a half-life $t_{1/2}$ of 1 hour, the temperature of the first radical initiator is 75° C., the temperature of the second radical initiator for a half-life $t_{1/2}$ of 1 hour is at least 80° C.

The difference in the temperature for a given half-life between the first radical initiator and the second radical initiator is preferably not more than 50 K. This means that if, for a half-life $t_{1/2}$ of 1 hour, the temperature of the first radical initiator is 50° C., the temperature of the second radical initiator for a half-life $t_{1/2}$ of 1 hour is not more than 100° C.

More preferably, the difference in temperature for a given half-life between the radical initiators is between 5 K and 50 K and, more preferably, between 6 K and 40 K, and more preferably still between 7 K and 30 K.

The percentage by mass of initiator relative to the total weight of the mixture of (meth)acrylic monomers in the liquid composition is preferably between 0.05% by weight and 3% by weight, preferably between 0.1% by weight and 2% by weight.

The radical initiators may be selected from diisobutyryl peroxide, cumyl peroxyneodecanoate, di(3-methoxybutyl) peroxydicarbonate, 1,1,3,3-tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl) peroxydicarbonate, tert-butyl peroxyneodecanoate, di-n-butyl peroxydicarbonate, dicetyl peroxydicarbonate, dimyristyl peroxydicarbonate, 1,1,3,3-tetramethylbutyl peroxypivalate, tert-butyl peroxyneoheptanoate, tert-amyl peroxypivalate, tert-butyl peroxypivalate, di-(3,5,5-trimethylhexanoyl) peroxide, dilauroyl peroxide, didecanoyl peroxide, 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di(tert-butylperoxy)-3,3,5-trimethylcyclohexane, 1,1-di(tert-amylperoxy)cyclohexane, 1,1-di(tert-butylperoxy)cyclohexane, tert-amyl peroxy-2-ethylhexylcarbonate, tert-amyl peroxyacetate, tert-butyl peroxy-3,5,5-trimethylhexanoate, 2,2-di(tert-butylperoxy)butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amyl peroxide, dicumyl peroxide, di(2-tert-butylperoxyisopropyl)benzene, 2,5-dimethyl-2,5-di(tert-butylperoxy)hexane, tert-butylcumyl peroxide, 2,5-dimethyl-2,5-di(tert-butylperoxy)hex-3-yne, di-tert-butyl peroxide, 3,6,9-triethyl-3,6,9-trimethyl-1,4,7-triperoxononane, 2,2'-azobisisobutyronitrile (AIBN), 2,2'-azodi(2-methylbutyronitrile), azobisisobutyramide, 2,2'-azobis(2,4-dimethylvaleronitrile), 1,1'-azodi(hexahydrobenzonitrile) or 4,4'-azobis(4-cyanopentanoic acid).

The first radical initiator is preferably selected from cumyl peroxyneodecanoate, di(3-methoxybutyl) peroxydicarbonate, 1,1,3,3-tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl) peroxydicarbonate, tert-butyl peroxyneodecanoate, di-n-butyl peroxydicarbonate, dicetyl peroxydicarbonate, dimyristyl peroxydicarbonate, 1,1,3,3-tetramethylbutyl peroxypivalate, tert-butyl peroxyneoheptanoate, tert-amyl peroxypivalate, tert-butyl peroxypivalate, di-(3,5,5-trimethylhexanoyl) peroxide, dilauroyl peroxide, didecanoyl peroxide, 2,5-dimethyl-2,5-di(2-ethylhexanoylperoxy)hexane or 1,1,3,3-tetramethylbutyl peroxy-2-ethylhexanoate.

The second radical initiator is preferably selected from tert-amyl peroxypivalate, tert-butyl peroxypivalate, di-(3,5,5-trimethylhexanoyl) peroxide, dilauroyl peroxide, didecanoyl peroxide, 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy)cyclohexane, 1,1-di(tert-butylperoxy)cyclohexane, tert-amyl peroxy-2-ethylhexylcarbonate, tert-amyl peroxyacetate, tert-butyl peroxy-3,5,5-trimethylhexanoate, 2,2-di(tert-butylperoxy)butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amyl peroxide, dicumyl peroxide, di(2-tert-butylperoxyisopropyl)benzene, 2,5-dimethyl-2,5-di(tert-butylperoxy)hexane, tert-butylcumyl peroxide, 2,5-dimethyl-2,5-di(tert-butylperoxy)hex-3-yne, di-tert-butyl peroxide or 3,6,9-triethyl-3,6,9-trimethyl-1,4,7-triperoxononane.

The ratio between the two radical initiators is between 1/10 and 10/1, preferably between 1/5 and 5/1 and more preferably between 1/4 and 4/1.

In a first preferred embodiment, the first radical initiator is selected from di(4-tert-butylcyclohexyl) peroxydicarbonate.

The second radical initiator in this first preferred embodiment is selected from benzoyl peroxide, t-butyl peroxy-2-ethylhexanoate, dilauroyl peroxide and didecanoyl peroxide.

In a second preferred embodiment, the first radical initiator is selected from dicetyl peroxydicarbonate.

The second radical initiator in this second preferred embodiment is selected from benzoyl peroxide, t-butyl peroxy-2-ethylhexanoate, dilauroyl peroxide and didecanoyl peroxide.

In a third preferred embodiment, the first radical initiator is selected from dimyristyl peroxydicarbonate.

The second radical initiator in this third preferred embodiment is selected from benzoyl peroxide, t-butyl peroxy-2-ethylhexanoate, dilauroyl peroxide and didecanoyl peroxide.

The Fillers and Additives

The liquid composition according to the invention may further comprise one or more additives and/or one or more fillers. All the optional additives and fillers are added to the liquid composition, or liquid (meth)acrylic syrup, before the impregnation and/or the polymerization. A filler is not considered to be an additive in the context of the present invention.

The carbon-based fillers may in particular be active charcoal, natural anthracite, synthetic anthracite, carbon black, natural graphite, synthetic graphite, carbon-based nanofillers or mixtures thereof. They are preferably selected from carbon-based nanofillers, in particular from graphenes and/or carbon nanotubes and/or carbon nanofibrils or mixtures thereof. These fillers make it possible to conduct electricity and heat, and consequently make it possible to improve the lubrication of the polymer matrix when it is heated. They may then enable an increased reduction in cycle times or facilitate assembly, adjustment or repair of the composite parts.

The mineral fillers notably include metal hydroxides, which take the form more particularly of alumina trihydrate (Al(OH)$_3$), calcium carbonate, silicates, zinc sulfide, iron oxides, titanium dioxide, silica or mineral nanofillers such as nanotitanium dioxides or nanosilicas. The composition according to the invention preferably further comprises a mineral filler selected from: calcium carbonate (CaCO$_3$), titanium dioxide (TiO$_2$), aluminum oxide (Al$_2$O$_3$), and silica (SiO$_2$). The calcium carbonate may take the form, for example, of particles with a diameter of approximately 5 μm and preferably not more than 5 μm.

The liquid composition according to the invention may not comprise any fillers. When fillers are added, the amount of fillers may for example be between 50 phr and 400 phr, preferably between 75 phr and 300 phr and more preferably between 100 phr and 250 phr.

Additives that may be mentioned include organic additives such as impact modifiers or block copolymers, heat stabilizers, UV stabilizers, lubricants, viscosity modifiers, pH modifiers (sodium hydroxide solution), particle size modifiers (sodium sulfate), biocides, polymerization inhibitors, mold release agents, wetting and dispersing additives, deaerating additives, shrinkage modifiers, flame retardant fillers, pigments, coupling agents, and mixtures thereof. These additives make it possible notably to improve the rheological, chemical and adhesion properties of the (meth)acrylic thermoplastic polymer matrix.

The impact modifier is in the form of fine particles having an elastomeric core and at least one thermoplastic shell, the size of the particles being in general less than 1 μm and advantageously from 50 to 300 nm. The impact modifier is prepared by emulsion polymerization. The proportion of impact modifiers in the thermoplastic polymer matrix is 0 to 50%, preferably 0 to 25%, and advantageously 0 to 20% by weight. As fillers, mention may be made of carbon nanotubes or mineral fillers including mineral nanofillers (TiO$_2$, silica).

The liquid composition according to the invention may also, optimally, comprise a polymerization activator. The polymerization activator or accelerator is selected from tertiary amines such as N,N-dimethyl-p-toluidine (DMPT), N,N-dihydroxyethyl-p-toluidine (DHEPT), organic-soluble transition metal catalysts or mixtures thereof.

Advantageously, the liquid (meth)acrylic composition does not contain any metal-based catalysts. No additive comprising a metal as activator to catalytically accelerate the polymerization reaction is added to the liquid (meth)acrylic composition according to the invention. This in particular concerns tin-based compounds such as tin chloride.

The content of the activator relative to the (meth)acrylic monomer of the liquid (meth)acrylic composition is from 100 ppm to 10 000 ppm (by weight), preferably from 200 ppm to 7000 ppm by weight and advantageously from 300 ppm to 4000 ppm.

A polymerization inhibitor may also be incorporated in the formulation. The amount of inhibitor is optimized to allow complete filling of the mold before the gel point is reached, and a rapid production cycle.

A mold release agent may be used to reduce the adhesion between the mold and the composite, to allow the molded part to be extracted from the press without being damaged. A mold release agent may be external (wax or lubricant applied to the surface of the mold) or internal. For example, the liquid composition according to the invention may comprise an internal mold release agent selected from calcium, zinc or magnesium stearates, preferably in powder form.

The composition may also comprise a wetting agent and dispersant such as an oligomeric or polymer surfactant which is soluble in the resin. This agent may consist, for example, of a polar head with a high affinity for the CaCO$_3$ fillers, and of a chain of lower polarity which has a high affinity for the thermoplastic resin. This additive reduces the interfacial tension between the fillers and the resin, thereby facilitating the wetting of the fillers during the formulation of the pastes.

The liquid composition according to the invention preferably comprises at least one additive. Nevertheless, the amount of additives added to the liquid composition is preferably less than 100 phr, more preferably less than 50 phr and more preferably still less than 25 phr.

The percentage by mass of all of the additives relative to the total weight of (meth)acrylic thermoplastic polymer matrix is preferably less than 30%, preferably less than 10%.

All the optional additives and fillers are added to the liquid (meth)acrylic syrup before the impregnation and/or the polymerization.

The invention, according to another aspect, relates to a process for preparing the liquid composition according to the invention, or (meth)acrylic syrup, where a first step involves preparing a mixture of (meth)acrylic polymer and of (meth)acrylic monomer, where said (meth)acrylic polymer and/or said (meth)acrylic monomer comprises at least one carboxylic acid function.

The process advantageously further comprises a step of adding at least one radical initiator. The radical initiator is preferably added at a temperature Tadd of less than 50° C., more preferably less than 40° C., advantageously less than 30° C. and more advantageously less than 25° C.

The process may further comprise a step of mixing at a mixing temperature of 10 to 50° C. for a time of three hours or less, preferably two hours or less and more preferably 60 minutes or less.

A process of this kind for preparing the liquid composition or impregnating paste may be implemented in a mixer such as the mixer 10 shown in FIG. 1. This mixer is called the "principal mixer" in order to distinguish it from the mixer which is used for homogenizing the maturation agent in the paste in the SMC process (called "SMC mixer"). The process for preparing the liquid composition may therefore also comprise steps of: discharging the liquid products, stirring, discharging the fillers and the mold release agent (powders), followed by stirring and discharging the paste into the SMC mixer 20.

Formulation of the paste begins with the mixing of the liquid additives (e.g., (meth)acrylic polymer, (meth)acrylic monomer, wetting agent and dispersant). The powders (e.g., the mold release agent and the fillers) are subsequently dispersed in the resulting homogeneous mixture. The fillers (e.g., calcium carbonate), which may represent more than 40% of the volume of the paste, may be incorporated in several stages. The paste produced is then transferred to another vessel, the SMC mixer 20, before impregnating the fibrous reinforcement in the SMC process.

The maturation agent may subsequently be added to the paste, for example within the SMC mixer 20, from a container 31. Since the introduction of the maturation agent gives rise to an immediate and gradual increase in the viscosity of the paste, it is appropriate to introduce it just before the use of the SMC compound. The SMC mixer 20 is supplied continuously with the paste from the principal mixer 10 and with the maturation agent. The radical initiator may also be added at this time, via a container 32. A dye, where appropriate, may also be incorporated.

Advantageously, the liquid composition retains a dynamic viscosity of between 10 mPa*s and 100 000 mPa*s, at 25° C., for at least thirty minutes and preferably for at least an hour. The liquid composition according to the invention, detailed in the paragraphs above, may be used for impregnating fibers or a fibrous reinforcement or for manufacturing thermoplastic parts or manufacturing composite parts.

This liquid composition may therefore be used for impregnating fibers or a fibrous reinforcement. Accordingly, according to another aspect, the invention relates to a process for manufacturing a preimpregnated fibrous material, the preimpregnated fibrous material being preferably a preimpregnated fibrous material in sheet form. This process comprises, in particular, a step of impregnating a fibrous reinforcement with a liquid composition according to the invention. This impregnation step may be performed on a belt, in a mold or a closed mold, or a bath.

An example of such a process is presented in FIG. 1.

The process presented in FIG. 1 is more particularly an SMC preparation process. It allows composites to be realized which, generally, are richer in fibrous reinforcement than in the BMC process, and also allows the use of longer fibers. Moreover, in contrast to the use of a BMC compound, the use of an SMC compound requires the incorporation of a maturation agent in order to allow easy handling of the sheet SMC prepreg without altering it when it is being molded (cutting, defilming, and placement of stacked blanks of substance in the mold).

As shown in FIG. 1, when the impregnating paste has been homogenized in the SMC mixer 20, it is poured into the reservoir of doctor blades 51, 52. A belt 53, preferably of metal, allows the SMC compound to pass into the calendering system 60, which takes the plastic films 45, taking with them a layer of paste, beneath each of the two doctor blades 51, 52. The plastic films 45 may be, for example, films of polyethylene, polypropylene, terephthalate polyester, polyamide, polyolefin, polyolefin and polyamide, or polyolefin/polyamide/polyolefin. The plastic films 45 have a carrier function for the impregnating paste and also a barrier function for preventing evaporation of the (meth)acrylic monomer; it may consist of a single layer or, preferably, of multiple layers. Preferably, it is composed of Orgalloy® (graft polypropylene-polyamide copolymer, registered trademark).

The fibrous reinforcement is placed in contact with the impregnating paste via a distribution device 80. For example, the fibrous reinforcement may be cut so as to cover a first paste film. A second paste film is then applied to the layer of fibrous reinforcement (e.g., to form a sandwich structure of the following type: plastic film/paste/glass fibers/paste/plastic film). The compound thus formed then passes onto the belt 53 and is compressed by the calendering system 60. This compression allows the paste to impregnate the fibrous reinforcement effectively, particularly by removing the air from the compound. Impregnation of this kind, followed by calendering, provides the SMC compound with a certain mechanical strength, which is subsequently greatly increased by the maturation reaction. The flow rates of paste and of fibrous reinforcement are controlled so as to obtain the desired level of reinforcement. These flow rates, associated with the production rate per unit surface that is imposed by the speed of the belt and the height of the doctor blades, also determine the eventual thickness of the SMC compound. The eventual thickness of the SMC compound according to the invention after calendering varies generally from 0.5 to 10 mm, preferably from 1 to 5 mm and more preferably from 1 to 4 mm, and more preferably still from 1 to 3 mm.

Accordingly, as shown in FIG. 1, the impregnation in the context of the process for manufacturing a composite material according to the invention may take place continuously. Moreover, the process for manufacturing a composite material according to the invention may comprise a calendering step.

The maturation reaction starts as soon as the maturation agent is incorporated into the paste in the SMC mixer 20. In one particular embodiment, the mixing of the paste with the maturation agent and the transport thereof to the doctor blades 51, 52 takes approximately 2 minutes, the transport of the paste films and the fibrous reinforcement to the calenders 1 minute, and the calendering of the SMC compound 1 minute. Moreover, the speed of the belt 53 is approximately 4 m/min. In contrast to the BMC process, it is not the transport of the paste which is critical in terms of viscosity, but the impregnation of the fibrous reinforcement. To form highly homogeneous paste films and to impregnate the fibrous reinforcement effectively, the viscosity of the paste in the reservoir of the doctor blades 51, 52 is preferably less than 200 Pa·s at 25° C. More preferably, the viscosity of the paste in the reservoir of the doctor blades 51, 52 is less than 150 Pa·s at 25° C., and more preferably still less than 100 Pa·s at 25° C.

Once they have been obtained, the SMC rolls 70 are then stored for a maturation step, which makes it possible to obtain a material which is easy to handle. During this step, the liquid composition according to the invention will undergo an increase in its viscosity, to reach a viscosity which allows easy handling of the fibrous materials preimpregnated with this liquid composition.

The maturation step may be carried out at a temperature of between 10° C. and 40° C., preferably between 20° C. and 30° C. This allows the maturation kinetics to be accelerated. It is appropriate to reach the pseudoplateau before using the preimpregnated fibrous reinforcement, since a substantial variation in the viscosity of the compound on the day of molding would require constant modification of the parameters of the press. The reason is that deviations in viscosity may be manifested in quality problems on the polymerized part (greater or lesser flow of the compound in the mold, etc.). Accordingly, the maturation step according to the invention is advantageous because it allows the SMC compound to be handled and molded rapidly after its realization, via a sharp and rapid increase in its viscosity. Moreover, as shown in the examples, the matured compound has a viscosity which is highly stable, allowing the compound to be transported before being used, by molding, for example.

The process for manufacturing a composite material according to the invention may also comprise a step of maturation at a temperature of between 10° C. and 100° C., preferably of between 15° C. and 80° C., more preferably between 20° C. and 50° C.

As will be detailed in the examples, the liquid composition used in the process according to the invention makes it possible to reduce the maturation time in relation to the similar processes performed with thermosetting polymers. Hence, in the context of the invention, it is possible to achieve maturation over a short time, which nevertheless makes it possible to obtain a composition impregnating the reinforcement that is sufficiently viscous to allow its handling. The maturation step preferably takes place over a time of 120 hours or less, preferably of 48 hours or less. Although the liquid composition according to the invention can reduce the duration of the maturation step, this step generally takes place over a time of greater than 2 hours. For example, the maturation step may be conducted over a time of between 24 hours and 48 hours.

Hence, in one embodiment, the preimpregnated fibrous reinforcement in sheet form, wound onto a calender at the end of calendering, is left to mature for 30 hours at 25-30° C. The objective of the maturation is to produce a sufficient increase in the viscosity of the compound to allow it to be handled at ambient temperature. The reason is that it must be possible for the compound to be cut, defilmed, and introduced into the mold (by an operative or a machine) without losses of substance.

The viscosity of the paste following the maturation step is, for example, greater than 500 Pa·s at 25° C. The viscosity of the paste following the maturation step is preferably greater than 1000 Pa·s at 25° C., more preferably greater than 10 000 Pa·s at 25° C., and more preferably still greater than 100 000 Pa·s at 25° C.

After the maturation step, and when the pseudoplateau has been reached, the preimpregnated fibrous reinforcements, or SMC compounds, may be stored at a temperature of less than 25° C. Following the maturation step and when the pseudoplateau has been reached, the preimpregnated fibrous reinforcements may undergo polymerization of the liquid composition impregnating the fibrous reinforcement.

A pseudoplateau or plateau means that the viscosity undergoes no significant further increase, meaning that the relative increase in the viscosity is less than +0.5%/min relative to the viscosity in Pa*s at this moment or in an interval of the time. The relative increase in the viscosity is preferably less than +0.4%/min, more preferably less than +0.3%/min, more preferably less than +0.2%/min, advantageously less than +0.1%/min and more advantageously less than +0.1%/min.

Fibrous Reinforcement

Fibrous reinforcement generally refers to a plurality of fibers, unidirectional rovings or a continuous filament mat, fabrics, felts or nonwoven fabrics which may be in the form of strips, webs, braids, strands or parts.

A fibrous reinforcement comprises an assembly of one or more fibers, generally several fibers, said assembly being able to have different forms and dimensions: one-dimensional, two-dimensional or three-dimensional. The one-dimensional form corresponds to linear long fibers. The fibers may be discontinuous or continuous. The fibers may be arranged randomly or parallel to one another, in the form of a continuous filament. The two-dimensional form corresponds to nonwoven reinforcements or fibrous mats or woven rovings or bundles of fibers, which may also be braided. Even if the two-dimensional form has a certain thickness and consequently in principle a third dimension, it is considered to be two-dimensional according to the present invention. The three-dimensional form corresponds, for example, to nonwoven fibrous reinforcements or mats or stacked or folded bundles of fibers or mixtures thereof; an assembly of the two-dimensional form in the third dimension.

The fibers may be discontinuous or continuous. The discontinuous, or chopped, fibers are particularly well suited to use in SMC composites, whereas the continuous, or long, fibers make it possible to obtain parts having enhanced mechanical properties.

When the fibers are discontinuous, the fibrous reinforcement is composed of chopped fibers having, for example, a length of between 3 mm and 100 mm. The chopped fibers preferably have a length of between 10 mm and 75 mm, more preferably between 12 mm and 50 mm, more preferably still between 25 mm and 50 mm.

When the fibers are continuous, they may be assembled to form fabrics. A fiber may be defined by its aspect ratio, which is the ratio between the length and the diameter of the fiber. The continuous, or long, fibers have an aspect ratio of at least 1000, preferably at least 1500, more preferably at least 2000, advantageously at least 3000 and more advantageously at least 5000, even more advantageously at least 6000, even more advantageously at least 7500 and most advantageously at least 10 000. The dimensions of a fiber can be measured by methods well known to those skilled in the art. Preferably, these dimensions are measured by microscopy according to standard ISO 137. An aspect ratio of this kind makes it possible to obtain composite parts which have better mechanical properties.

In particular, in the context of the manufacturing process according to the invention, the fibrous reinforcement may be composed of a mixture of short fibers and long fibers. The short and long fibers are preferably defined as set out above.

The origins of the fibers constituting the fibrous reinforcement may be natural or synthetic. Natural materials that may be mentioned include plant fibers, wood fibers, animal fibers or mineral fibers. Plant fibers are, for example, sisal, jute, hemp, linen, cotton, coconut, and banana fibers. Animal fibers are, for example, wool or fur. The mineral fibers may also be chosen from glass fibers, in particular of type E, R or S2, basalt fibers, carbon fibers, boron fibers or silica fibers.

Synthetic materials that may be mentioned include polymer fibers selected from thermosetting polymer fibers, thermoplastic polymers or mixtures thereof. The polymer fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

Preferably, the fibrous reinforcement of the present invention comprises plant fibers, wood fibers, animal fibers, mineral fibers, synthetic polymer fibers, glass fibers, basalt fibers and carbon fibers, alone or in a mixture. More preferably, the fibrous reinforcement comprises fibers selected from carbon fibers or glass fibers or basalt fibers or polymer-based fibers or plant fibers, alone or in a mixture. More preferably still, the fibrous reinforcement of the present invention comprises carbon fibers or glass fibers.

The fibers of the fibrous reinforcement have for example a diameter of between 0.005 µm and 100 µm, preferably between 1 µm and 50 µm, more preferably between 5 µm and 30 µm and advantageously between 10 µm and 25 µm.

Preferably, the fibers of the fibrous reinforcement of the present invention are selected from continuous fibers for the one-dimensional form, or from long or continuous fibers for the two-dimensional or three-dimensional form of the fibrous reinforcement.

According to another aspect, the invention relates to a process for manufacturing composite parts. This process for manufacturing composite parts includes in particular a step of shaping the preimpregnated fibrous material according to the invention. For example, the preimpregnated fibrous material takes the form of a prepreg substance in sheet form.

The shaping step is preferably a molding step. The preimpregnated fibrous materials may, for example, be molded by compression after automated handling of the compound. Accordingly, the manufacturing process according to the invention may comprise a molding step. This molding step is advantageously performed under pressure and at a temperature of between 50° C. and 200° C. The molding temperature is preferably between 60° C. and 180° C., more preferably between 80° C. and 140° C. and more preferably between 80° C. and 125° C. For example, the molding step is a compression molding step. The pressure applied is, for example, between 25 and 150 bar, preferably between 50 and 120 bar.

In one embodiment, the preimpregnated fibrous material is molded by compression at between 50 and 120 bar, at a temperature in the region of 110° C., for 2 to 3 minutes. To produce a conventional composite part, four blanks of preimpregnated fibrous material with a thickness of 1 to 2 mm each are cut out, defilmed, and stacked on the punch of the press. The level of covering corresponds to the ratio between the surface area of the blanks and the total surface area of the mold. When the mold has been closed by lowering the die (hollow part), the preimpregnated substance flows until it occupies the whole of the mold. The final thickness of the part after flow and polymerization is approximately 3 mm.

The rate of molding of these composites is fairly high, with a cycle time of preferably between 2 and 3 minutes. When they have been molded, the composite parts are deburred, optionally glued to one another (bodywork and lining parts, for example), and painted. The duration of the molding step is therefore preferably less than or equal to 10 minutes, more preferably less than or equal to 5 minutes, and, for example, between 1 minute and 5 minutes.

As has already been stated, the liquid composition advantageously comprises a substantial amount of thermoplastic polymer. Accordingly, the composite according to the invention may undergo transformations more easily. For example, composite parts of this kind obtained by the SMC process may subsequently be retrospectively shaped by a post-manufacturing thermal step, by bending, folding, in curved shapes, or else in twist form. They may also be assembled by welding, since they retain a thermoplastic character which is vital for the implementation of this welding step (thermosetting composites can only be assembled by gluing). Mention may be made more particularly of the production of thermoplastic composite parts by SMC for transport and automotive applications, especially of structural or semistructural parts (tailgates, spoilers, wing support, emergency wheel tray, battery tray for electric vehicle, floor, truck front end, etc.).

The process for manufacturing composite parts may therefore comprise an additional step of postforming. Postforming comprises flexing and also modifying the shape of a composite material part. The process for manufacturing composite parts may further comprise the step of welding or gluing or laminating. The manufacturing process according to the invention may allow the production of complex composite parts employing, for example, compacting under vacuum with a skin of PMMA, or else the combination of thermoplastic composite parts.

The thermoplastic composite parts obtained by the processes according to the invention may be postformed, welded or glued or laminated after polymerization of the liquid composition of the invention.

According to another aspect, the invention relates to a polymer composite material comprising a thermoplastic (meth)acrylic matrix and a fibrous reinforcement. In this composite material, the thermoplastic (meth)acrylic matrix is obtained after polymerization of the liquid composition according to the invention that impregnates a fibrous reinforcement.

A composite material of this kind may subsequently be worked for use in numerous applications. According to another aspect, the invention relates to a composite material part according to the invention or obtained by the manufacturing process according to the invention.

The composite material part according to the invention may be, for example, a motor vehicle part, a boat part, a train part, a sports article, an airplane or helicopter part, a spaceship or rocket part, a photovoltaic module part, a material for construction or building, as for example composite armatures, dowels and calipers for civil engineering and high-rise construction, a wind turbine part, as for example a girder spar cap of a wind turbine blade, a furniture part, a construction or building part, a telephone or cellphone part, a computer or television part, or a printer or photocopier part.

The composite material part according to the invention is preferably a structural or semistructural part of a vehicle. The reason for this is that a part of this kind, by virtue of its mechanical properties arising in particular from the liquid composition according to the invention, is particularly advantageous for use in the design of vehicles, and has a Young's modulus of between 10 and 125 GPa, preferably between 8 and 60 GPa.

The composite material part is advantageously a three-dimensional part.

EXAMPLES

Example 1

A liquid composition is prepared by dissolving 20% by weight of PMMA with a composition of MMA/EA/MAA 88.5/10/1.5 (a copolymer of MMA comprising 88.5% by weight of MMA and, as comonomers, 10% by weight of ethyl acrylate (EA) with 1.5% by weight of methacrylic acid (MAA)) in 80% by weight of methyl methacrylate.

The PMMA has a weight-average molecular weight of 120 000 g/mol, and the viscosity of the liquid composition is 100 mPa·s.

This liquid composition is admixed with a maturation agent, presently MgO, at different concentrations: 1 phr, 3 phr and 5 phr.

The frequency dynamic viscosity at ambient temperature (25° C.) is then measured on an Anton-Paar system after 1 week (complex viscosity $\eta^*$ according to the Carreau model).

Figure 2A:
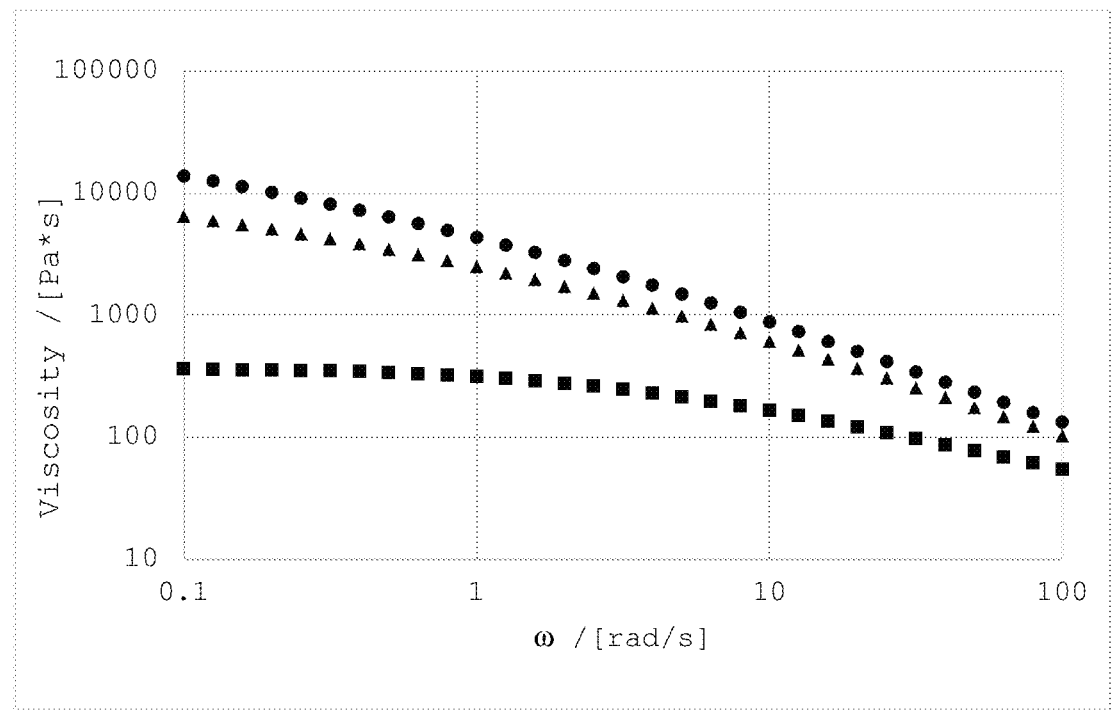
FIGS. 2A and 2B, the effect of the level of maturation agent on the viscosity of two liquid compositions according to the invention after 7 days. The concentrations of maturation agent are respectively 1 phr (square), 5 phr (triangle), and 10 phr (circle).

The results of this dynamic viscosity measurement are presented in FIG. 2A. They show that after a week of maturation, the liquid composition has a viscosity which is at least 1000 times higher than the viscosity of the liquid composition before the addition of the maturation agent, irrespective of the amount of maturation agent added. When the measurement is effected at a rate or angular frequency $\omega$ of 1 rad·s−1, the viscosity measured is between 1 000 Pa·s and 10 000 Pa·s.

Example 2

A liquid composition is prepared by dissolving 20% by weight of PMMA with a composition of MMA/MAA 95.5/4.5 (a copolymer of MMA comprising 95.5% by weight of MMA and, as comonomer, 4.5% by weight of methacrylic acid) in 80% by weight of methyl methacrylate.

The PMMA has a weight-average molecular weight of 100 000 g/mol, and the viscosity of the liquid composition is 100 mPa·s.

This liquid composition is admixed with a maturation agent, presently MgO, at different concentrations: 1 phr, 3 phr and 5 phr.

The frequency dynamic viscosity at ambient temperature is then measured on an Anton-Paar system after 1 week (complex viscosity $\eta^*$ according to the Carreau model).

Figure 2B:
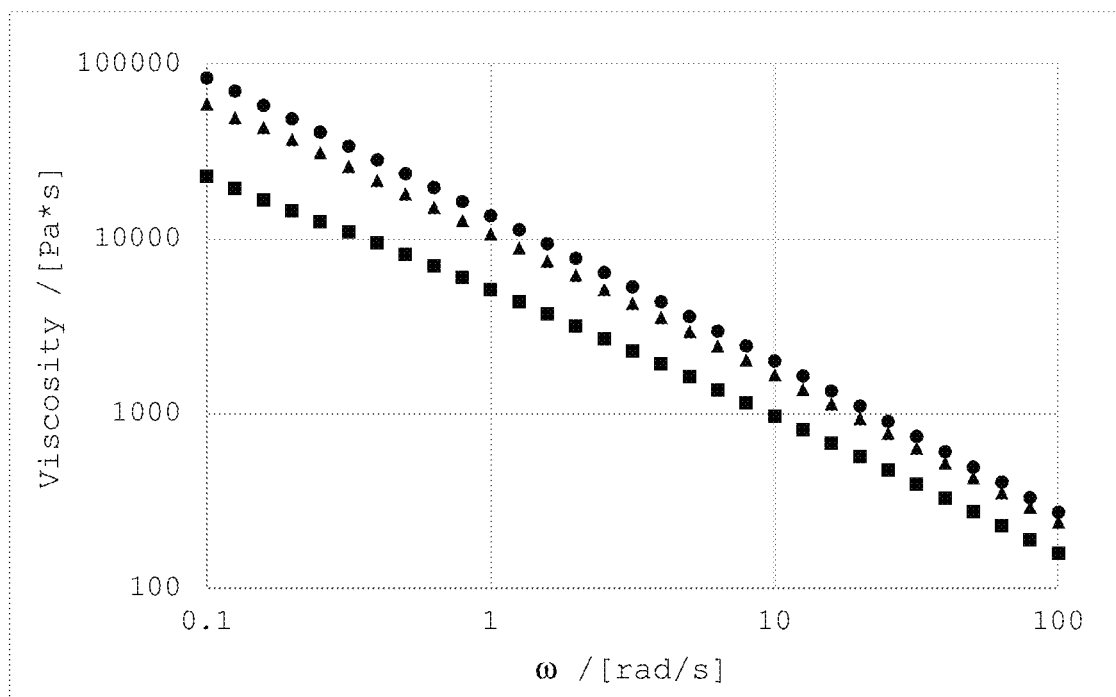

The results of this dynamic viscosity measurement are presented in FIG. 2B. They show that after a week of maturation, the liquid composition has a viscosity which is at least 10 000 times higher than the viscosity of the liquid composition before the addition of the maturation agent, irrespective of the amount of maturation agent added. When the measurement is effected at a rate or angular frequency $\omega$ of 1 rad·s−1, the viscosity measured is approximately 10 000 Pa·s.

Example 3

A first liquid composition is prepared by dissolving 20% by weight of PMMA with a composition of MMA/EA/MAA 88.5/10/1.5 (a copolymer of MMA comprising 88.5% by weight of MMA and, as comonomers, 10% by weight of ethyl acrylate with 1.5% by weight of methacrylic acid) in 80% by weight of methyl methacrylate. The PMMA has a weight-average molecular weight of 120 000 g/mol, and the viscosity of the liquid composition is 100 mPa·s. This liquid composition is admixed with a maturation agent, presently MgO, at a concentration of 3 phr.

A second liquid composition is prepared by dissolving 20% by weight of PMMA with a composition of MMA/MAA 95.5/4.5 (a copolymer of MMA comprising 95.5% by weight of MMA and, as comonomer, 4.5% by weight of methacrylic acid) in 80% by weight of methyl methacrylate. The PMMA has a weight-average molecular weight of 100 000 g/mol, and the viscosity of the liquid composition is 100 mPa·s. This liquid composition is admixed with a maturation agent, presently MgO, at a concentration of 3 phr.

A third liquid composition is prepared by dissolving 20% by weight of a mixture of two PMMAs above used in the first and second compositions at a ratio by mass of 1:1 in 80% by weight of methyl methacrylate. This liquid composition is admixed with a maturation agent, presently MgO, at a concentration of 3 phr.

Figure 3:
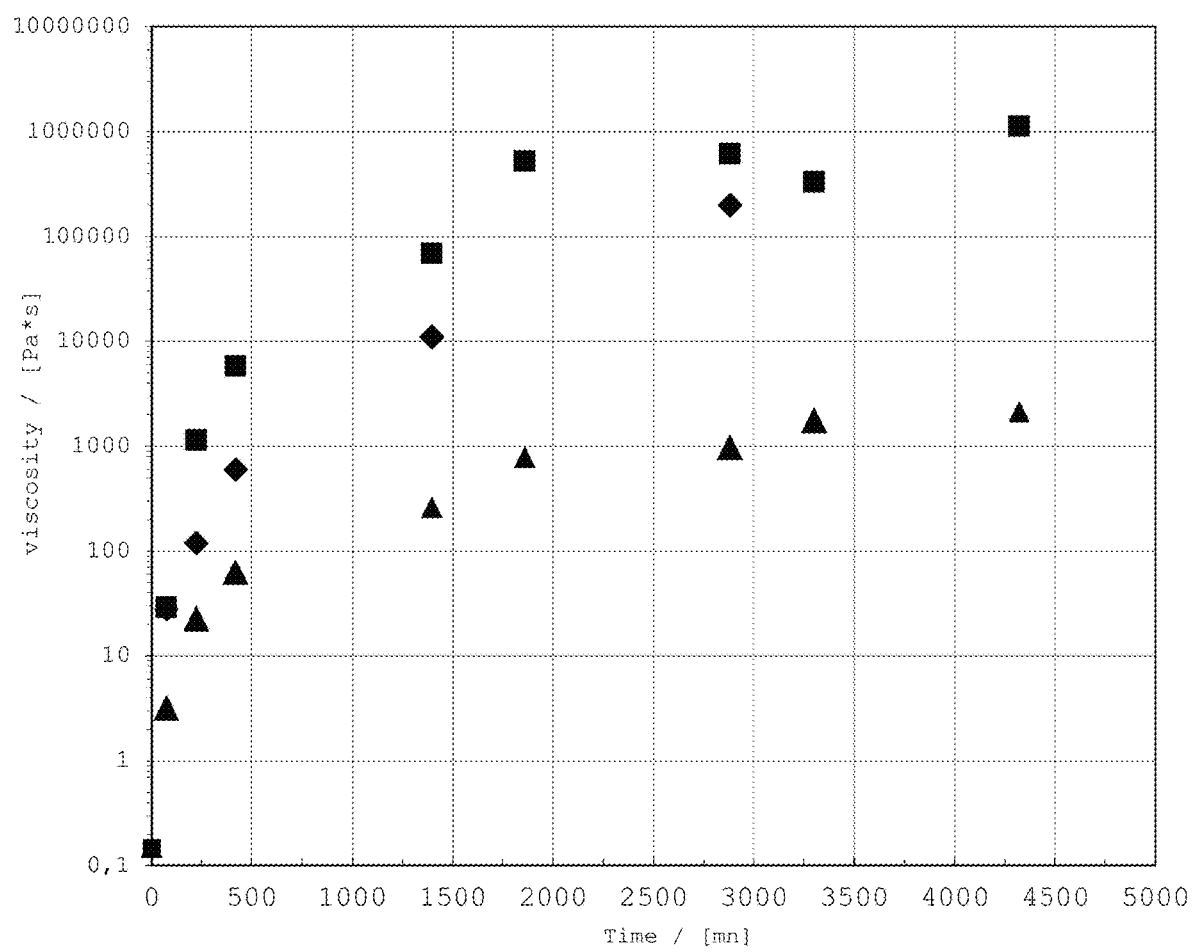
FIG. 3, the viscosity over time of two liquid compositions according to the invention comprising different amounts of carboxyl functions in the (meth)acrylic polymer, specifically 1.5% (triangle) and 4.5% (square), and a mixture of two (meth)acrylic polymers with 1.5% and 4.5% respectively of carboxyl functions in the (meth)acrylic polymer (diamond).

The change in the Newtonian viscosity (complex viscosity $\eta^*$ at zero shear rate according to the Carreau model) is monitored over time for these three compositions and is shown in FIG. 3.

The results of these measurements of the change in Newtonian viscosity show that the viscosity increases very rapidly to reach a plateau after 1900 minutes, or less than 48 hours.

Accordingly, the liquid composition according to the invention allows a sharp reduction in the maturation time required.

Example 4

A number of liquid compositions may be prepared according to the invention. They are prepared by dissolving from 20% to 25% by weight of (meth)acrylic polymer in (meth)acrylic monomer. This liquid composition is admixed with a maturation agent, presently MgO, at a concentration of 3 phr.

| Characteristics of the composite material | Ex. 1 | Ex. 2 | Ex. 3 | Ex. 4 | Ex. 5 | Ex. 6 |
|---|---|---|---|---|---|---|
| % by weight of carboxylic function in monomer | 0 | 0 | 0 | 0 | 2% | 2% |
| % by weight of carboxylic function in polymer | 1.5% | 4.5% | 10% | 4.5% | 0% | 1.5% |
| % by weight of polymer in the monomer | 25% | 25% | 25% | 25% | 20% | 20% |
| weight-average molecular weight of the polymer, Mw/[kg/[mol] | 120 | 100 | 80 | 62 | 130 | 120 |

The liquid compositions according to the invention exhibit a polymer having a weight-average molecular weight of between 62 000 and 130 000 g/mol, and the viscosity of the liquid composition is 100 mPa·s.

The weight-average molecular weight Mw of the polymers is measured by size exclusion chromatography (SEC).

A part formed with a liquid composition comprising a polymer having a weight-average molecular weight of 62 000 g/mol (Ex. 4) will not exhibit the same mechanical properties as a part formed with a liquid composition comprising a polymer having a weight-average molecular weight of at least 80 000 g/mol (Ex. 3).

Example 5

The liquid composition according to the invention may be formulated according to the knowledge of the skilled person.

The table below presents a typical formulation which can be used for impregnating a fibrous reinforcement.

| Category | Concentration (phr) | Compound |
|---|---|---|
| (Meth)acrylic monomer | 75 | Methyl methacrylate |
| (Meth)acrylic polymer | 25 | PMMA with composition of MMA/AMA 95.5/4.5 |

-continued

| Category | Concentration (phr) | Compound |
|---|---|---|
| Maturation agent | 2 | MgO |
| Radical initiator | 2.5 | Dicetyl peroxydicarbonate and benzoyl peroxide |
| Mineral filler | 250 | Alumina trihydrate |
| Wetting agent and dispersant | 2 | Phosphate ether |
| Mold release agent | 5 | Zinc stearate |

After homogenization, between 5% and 60% by mass or 20% and 40% by mass of fibrous reinforcement may be added to this liquid composition.

A number of SMC composite plaques are prepared from a preimpregnated fibrous material in examples 6 to 9. Polymerization is carried out for 6 minutes in a mold heated at between 110° C. and 120° C. at a force of 400-600 kN for compositions with glass fibers and 1200 kN for compositions with carbon fibers. The residual monomer content is measured by gas chromatography. The flexural properties are determined according to the standard ISO 14125:1998 (Fiber-reinforced plastic composites—Determination of flexural properties); breaking stress in flexure, Young's modulus in flexure, and elongation are measured.

Example 6

| Category | Concentration (phr) | Compound |
|---|---|---|
| (Meth)acrylic monomer | 75 | Methyl methacrylate |
| (Meth)acrylic polymer | 25 | PMMA with composition of MMA/MAA 95.5/1.5 |
| Maturation agent | 1 | MgO |
| Radical initiator | 2 | 2,5-Dimethyl-2,5-di(2-ethylhexanoylperoxy)hexane |
| Mineral filler | 200 | Alumina trihydrate |
| Wetting agent and dispersant | 2 | Phosphate ether |
| Mold release agent | 5 | Surface-active substances (BYK P9912) |
| Glass fiber | 100 | Chopped glass fiber (OCV P204) |

Residual monomer (MMA): 0.23±0.1%
stress=207±16 MPa, modulus E=9.56±0.44 GPa, elongation e=3.14±0.31%.

Example 7

| Category | Concentration (phr) | Compound |
|---|---|---|
| (Meth)acrylic monomer | 75 | Methyl methacrylate |
| (Meth)acrylic polymer | 25 | PMMA with composition of MMA/MAA 95.5/1.5 |
| Maturation agent | 0.75 | MgO |
| Radical initiator | 2 | 2,5-Dimethyl-2,5-di(2-ethylhexanoylperoxy)hexane |
| Mineral filler | 350 | Alumina trihydrate |
| Wetting agent and dispersant | 3.5 | Phosphate ether |
| Mold release agent | 5 | Surface-active substances (BYK P9912) |
| Glass fiber | 50 | Chopped glass fiber (OCV P204) |

Residual monomer (MMA): 0.275±0.05% on plate
stress=110±13 MPa, modulus E=5.23±0.79 GPa, elongation e=2.48±0.67%.

Example 8

| Category | Concentration (phr) | Compound |
|---|---|---|
| (Meth)acrylic monomer | 75 | Methyl methacrylate |
| (Meth)acrylic polymer | 12.5 | PMMA with composition of MMA/MAA 95.5/1.5 |
| (Meth)acrylic polymer | 12.5 | PMMA with composition of MMA/MAA 95.5/4.5 |
| Maturation agent | 1.3 | MgO |
| Radical initiator | 2 | 2,5-Dimethyl-2,5-di(2-ethylhexanoylperoxy)hexane |
| Mold release agent | 4 | Surface-active substances (BYK P9912) |
| Carbon fiber | 100 | Chopped carbon fiber (Mitsubishi 12k) |

Residual monomer (MMA): 0.405±0.025% on plate
stress=457±85 MPa, modulus E=41.21±7.52 GPa, elongation e=1.82±0.25%.

Example 9

| Category | Concentration (phr) | Compound |
|---|---|---|
| (Meth)acrylic monomer | 75 | Methyl methacrylate |
| (Meth)acrylic polymer | 25 | PMMA with composition of MMA/MAA 95.5/1.5 |
| Maturation agent | 1 | MgO |
| Radical initiator | 2 | 2,5-Dimethyl-2,5-di(2-ethylhexanoylperoxy)hexane |
| Mineral filler | 150 | Alumina trihydrate |
| Wetting agent and dispersant | 2 | Phosphate ether |
| Mold release agent | 5 | Surface-active substances (BYK P9912) |
| Carbon fiber | 167 | Chopped carbon fiber (Mitsubishi 12k) |

Residual monomer (MMA): 0.39±0.03% on plate
Stress=249±67 MPa, modulus E=27.94±4.48 GPa, elongation e=1.35±0.15%.

The invention claimed is:
1. A liquid composition comprising:
   a) a (meth)acrylic polymer,
   b) a mixture containing a first (meth)acrylic monomer and a second (meth)acrylic monomer carrying a carboxylic acid function, and
   c) a maturation agent selected from a metal oxide or a metal hydroxide,
   said liquid composition having a dynamic viscosity of between 10 mPa·s and 10,000 mPa·s at 25° C.,
   wherein the (meth)acrylic polymer in the liquid composition is present in proportions of between 10% and 30%, by weight of a total amount of the (meth)acrylic monomer mixture and the (meth)acrylic polymer,
   wherein said liquid composition comprises 1% by weight to 10% by weight of the second (meth)acrylic monomer.
2. The liquid composition as claimed in claim 1, wherein the the (meth)acrylic polymer carries a carboxylic acid function.

3. The liquid composition as claimed in claim 1, wherein the (meth)acrylic polymer comprises at least 1% by weight of a monomer a carrying a carboxylic acid function.

4. The liquid composition as claimed claim 1, wherein the second (meth)acrylic monomer carrying the carboxylic acid function is selected from the group consisting of: acrylic acid and methacrylic acid.

5. The liquid composition as claimed in claim 1, wherein the (meth)acrylic polymer is a block copolymer.

6. The liquid composition as claimed in claim 1, wherein the weight-average molecular weight of the (meth)acrylic polymer is greater than or equal to 70000 g/mol.

7. The liquid composition as claimed in claim 1, wherein the maturation agent is selected from the group consisting of: MgO, Mg(OH)$_2$, CaO, Ca(OH)$_2$, and ZnO.

8. The liquid composition as claimed in claim 1, wherein said composition comprises at least 1% by weight of said maturation agent.

9. The liquid composition as claimed in claim 1, wherein said maturation agent is magnesium oxide.

10. The liquid composition as claimed in claim 1, wherein the composition comprises:
   a) from 10% by weight to 30% by weight of (meth)acrylic polymer,
   b) from 40% by weight to 90% by weight of the (meth)acrylic monomer mixture,
   c) from 0.5 phr to 10 phr of maturation agent.

11. The liquid composition as claimed in claim 1, wherein said composition comprises:
   a) from 10% by weight to 30% by weight of the (meth)acrylic polymer, wherein the (meth)acrylic polymer comprising at least 1% by weight of a monomer which carries a carboxylic acid function,
   b) from 40% by weight to 90% by weight of the (meth)acrylic monomer mixture, and
   c) from 0.5 phr to 10 phr by weight of maturation agent.

12. The liquid composition as claimed in claim 1, wherein said composition further comprises additives and/or fillers.

13. The liquid composition as claimed in claim 12, wherein said filler comprises a mineral filler selected from the group consisting of: calcium carbonate (CaCO3), titanium dioxide (TiO2), aluminum oxide (Al2O3), and silica (SiO2).

14. The liquid composition as claimed in claim 1, wherein said composition further comprises at least one initiator.

15. The liquid composition as claimed in claim 14, wherein said composition comprises at least two initiators and in that, at a given temperature, the two initiators have different half-lives.

16. The liquid composition as claimed in claim 15, wherein, for a given half-life, the difference in the temperature is at least 5 K between the two initiators.

17. A composite material part comprising a fibrous material that has been impregnated with the liquid composition of claim 1, polymerized formed into a part and polymerized, said part being selected from the group consisting of a motor vehicle part, a boat part, a train part, a sports article, an airplane or helicopter part, a spaceship or rocket part, a photovoltaic module part, a material for construction or building, composite armatures, dowels and calipers for civil engineering and high-rise construction, a wind turbine part, a girder spar cap of a wind turbine blade, a furniture part, a construction or building part, a telephone or cellphone part, a computer or television part, and a printer or photocopier part.

18. The composite material part as claimed in claim 17, wherein said part is a structural or semistructural part of a vehicle.

* * * * *